(12) United States Patent
Choi

(10) Patent No.: US 6,356,587 B1
(45) Date of Patent: Mar. 12, 2002

(54) DEVICE AND METHOD FOR CONVERTING VIDEO FORMAT OF DIGITAL TV

(75) Inventor: Sang Hoon Choi, Seoul (KR)

(73) Assignee: LE Electronics, Inc., Seoul (KR)

( * ) Notice: Subject to any disclaimer, the term of this patent is extended or adjusted under 35 U.S.C. 154(b) by 0 days.

(21) Appl. No.: 09/010,981

(22) Filed: Jan. 22, 1998

(30) Foreign Application Priority Data

Jan. 27, 1997 (KR) ............................................. 97/2250

(51) Int. Cl.[7] .................................................. H04B 1/66
(52) U.S. Cl. .......................... 375/240; 382/299; 382/300
(58) Field of Search .......................... 375/240, 240.17; 348/452, 146, 420, 699, 441, 445, 555, 537, 538; 382/299, 300

(56) References Cited

U.S. PATENT DOCUMENTS

| | | | | |
|---|---|---|---|---|
| 4,733,299 A | * | 3/1988 | Glenn | 348/448 |
| 5,430,490 A | * | 7/1995 | Rim | 348/452 |
| 5,485,216 A | * | 1/1996 | Lee | 348/443 |
| 5,808,688 A | * | 9/1998 | Sung | 348/441 |
| 5,835,150 A | * | 11/1998 | Choi | 348/441 |
| 5,844,614 A | * | 12/1998 | Chong et al. | 348/420 |
| 6,057,889 A | * | 5/2000 | Reitmeier et al. | 348/555 |

* cited by examiner

*Primary Examiner*—Chris Kelly
*Assistant Examiner*—Shawn S. An

(57) ABSTRACT

Device and method for converting a video format of a digital T.V. which can convert an SD video into an HD video, the device including a VLD for making a variable length decoding of a received bit stream to determine a received video source of being an SD video and provide a relevant signal according to a result of the determination, a detector for detecting existence of edge components of the SD image using inverse quantized DCT coefficients, and a format converter for interpolating and format converting an SD image data obtained by adding an IDCT SD image data and a motion compensated SD image data into an HD image data by applying an interpolation equation according to signal from the VLD and the detector, whereby distortion of the image and degradation of a picture quality are prevented.

10 Claims, 2 Drawing Sheets

DEVICE AND METHOD FOR CONVERTING VIDEO FORMAT OF DIGITAL TV

BACKGROUND OF THE INVENTION

1. Field of the Invention

The present invention relates to device and method for converting a video format of a digital T.V., and more particularly, to device and method for converting a video format of a digital T.V. which can convert an SD(Standard Definition) video into an HD(High Definition) video.

2. Discussion of the Related Art

In the GA(Grand Alliance) system proposed by the FCC (Federal Communication Committee), it has been established as a principle that a variety of video formats should be encoded or decoded. For example, there are video formats for video sources of 1080(V)*1920(H) interlaced scanning with 60 Hz field rate and of 720(V)*1280(H) progressive scanning with 24 Hz or 30 Hz frame rate in HDTV class and video formats for video sources of 480(V)*720(H) interlaced scanning with 24 Hz, 30 Hz or 60 Hz frame rate and of 480(V)*640(H) progressive scanning with 24 Hz, 30 Hz or 60 Hz frame rate in SDTV(NTSC) class. Thus, even though there are a variety of video formats which can be received, video formats displayable on a monitor are limited to one or two video formats to be consistent to performance of the monitor. And, even if an HDTV broadcasting is started, the current NTSC broadcasting will be in coexistence with the HDTV for a substantial time period. Therefore, when a display format of a digital TV is 720(V)*1280(H) progressive scanning of the HDTV class, though a video source with a 720(V)*1280(H) progressive scanning can be displayed directly, a video source with 480(V)*1280(H) interlaced scanning should be converted of its video format into 720(V)*1280(H) progressive scanning for display on the monitor. And, a frame size of an SD class video source should be enlarged as much as possible for display on an HD class frame because the SD class video source has a smaller frame size.

A background art method for converting a video format of a digital TV will be explained with reference to the attached drawings. FIGS. 1a~1c illustrate the background art method for converting a video format of the SD class into the HD class in a digital TV, and FIGS. 2a and 2b illustrate an example of video format conversion in a background art digital TV in which edge pixel components in an SD class image are converted into an HD class image. For example, when a video source of an SD progressive, or interlaced scanning image is to be converted into an HD class 1920*1080 interlaced scanning image, as shown in FIGS. 1a and 1b, vertical and horizontal components of the SD class image is 1:2 up sampled, and when the video source of an SD progressive, or interlaced scanning image is to be converted into an HD class 1280*720 progressive image, the vertical and horizontal components of the SD class image is 2:3 up sampled as shown in FIG. 1c. When an SD progressive, or interlaced scanning image is up sampled and converted into an HD progressive, or interlaced image, the vertical and horizontal components of the SD image do not exhibit any distortion of the image when displayed on the monitor as an HD image.

However, edge components shown in FIG. 2a are up sampled and displayed on the digital TV monitor, the diagonal components are displayed on the monitor with an distortion as shown in FIG. 2b, because the up sampling conducted in the line doubling technique even to the edge components regardless of positions of edge pixels in the SD image causes a phenomenon as shown in FIG. 2b. The diagonal component herein is an edge component of an outline of image on a diagonal line. The diagonal component is called an edge component, hereafter. That is, the background art method for converting a video format of a digital TV has a problem in that edge components of an SD progressive, or interlaced scanning image up sampled and converted into an HD interlaced image are not exhibited on a straight diagonal line but on an irregular line, thereby displaying a distorted image.

SUMMARY OF THE INVENTION

Accordingly, the present invention is directed to device and method for converting a video format of a digital TV that substantially obviates one or more of the problems due to limitations and disadvantages of the related art.

An object of the present invention is to provide device and method for converting a video format of a digital TV which can prevent distortion of an image.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for converting a video format of a digital TV having an inverse quantizer, an IDCT and motion compensator, includes a detector for detecting existence of edge components from an SD image data and providing a relevant signal accordingly, and a format convertor for interpolating and format converting an SD image data obtained by adding an SD image data from the IDCT and an SD image data from the motion compensator according to an output from the detector.

In the detection of existence of edge components, DCT coefficients of the SD image data are used.

In other aspect of the present invention, there is provided a method for converting a video format of a digital TV, including the steps of detecting existence of edge components in an SD image data from the inverse quantizer, and interpolating the SD image data by using an interpolation equation according to a result of detection in the step above, to make a format conversion of the SD image data into an HD image data.

The existence of edge components in the SD image data are determined according to a number of non-zero DCT coefficients of the inverse quantized SD image data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1A:
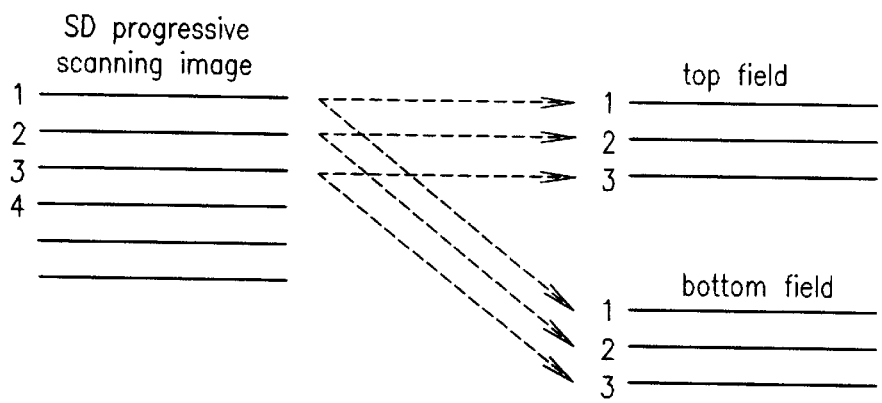
FIGS. 1a~1c illustrate a background art method for converting a video format of the SD class into the HD class in a digital TV.
Figure 1B:
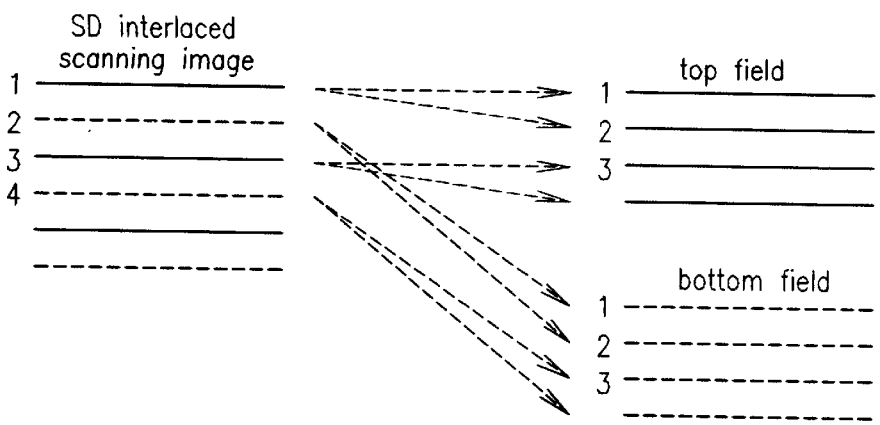
Figure 1C:
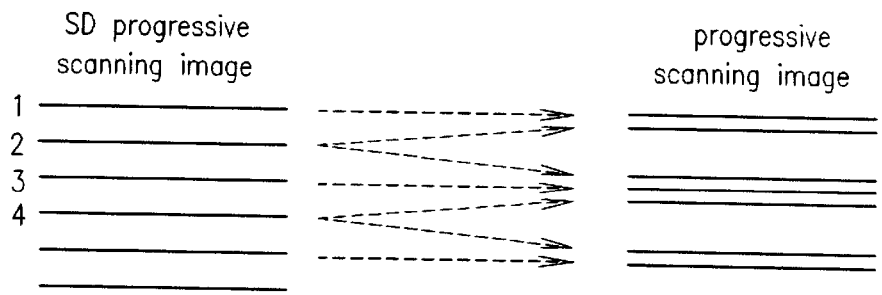
Figure 2A:
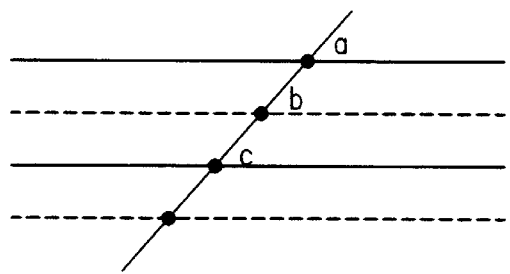
FIGS. 2a and 2b illustrate an example of video format conversion in a background art digital TV in which edge pixel components in an SD class video are converted into an HD class video; and, FIG. 3 illustrates a block diagram showing a system of a device for converting a video format of a digital TV in accordance with a preferred embodiment of the present invention.
Figure 2B:
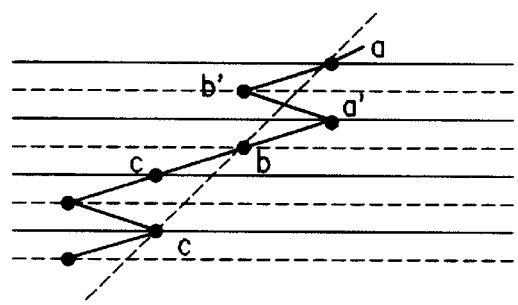
Figure 3:
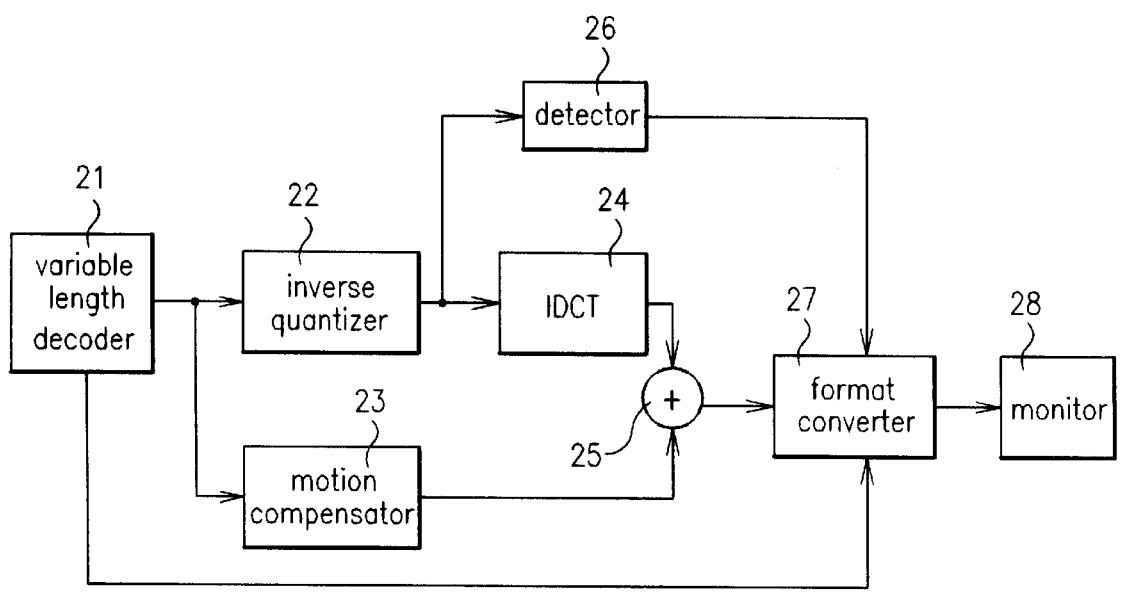

Reference will now be made in detail to the preferred embodiments of the present invention, examples of which are illustrated in the accompanying drawings. FIG. 3 illustrates a block diagram showing a system of a device for converting a video format of a digital TV in accordance with a preferred embodiment of the present invention.

Referring to FIG. 3, the device for converting a video format of a digital TV in accordance with a preferred embodiment of the present invention includes a VLD (Variable Length Decoder) 21 for making a variable length decoding of a received bit stream to separate into motion vectors, quantized values and DCT coefficients and providing a relevant signal in case the bit stream is an SD video format, an inverse quantizer 22 for inverse quantizing the DCT coefficients from the VLD 11 according to a weighting matrix and a quantizing scale code quant_scale_code, a motion compensator 23 for detecting information on an amount of movement of an image using the motion vector from the VLD 21, an IDCT 24 for making an IDCT(Inverse Discrete Cosine Transformation) of the data inverse quantized in the inverse quantizer 22, an adder 25 for adding outputs from the IDCT 24 and the motion compensator 23 into an original image, a detector 26 for detecting existence of edge components in the data from the inverse quantizer 22, a format convertor 27 for converting data of different formats from the adder 25 into a required format, a monitor 28 for displaying the data from the format convertor 27.

Upon reception of a bit stream of an SD image and audio data, the VLD 21 decodes the bit stream according to a bit length, to separate into motion vectors, quantized values and DCT coefficients, and applies a relevant signal to the format convertor 27 if the received data determined to be an SD data. That is, since information on a video source of being an SD class or an HD class is transmitted from a transmitter side, the information on a video source of being an SD class or an HD class can be obtained once the variable length decoding of the VLD 21 is conducted. The inverse quantizer 22 multiplies both the weighting matrix and the quant_scale_code to the DCT coefficients from the VLD 11, to inverse quantize the DCT coefficients, and provides the inverse quantized DCT coefficients both to the IDCT 24 and the detector 26, and the IDCT 24 makes an inverse discrete cosine transformation of the inverse quantized DCT coefficients and provides to the adder 25. The motion compensator 23 detects information on an amount of movement of an image using the motion vector from the VLD 21 and applies to the adder 25, and the adder 25 adds outputs from the IDCT 24 and the motion compensator 23 into an original image and provides to the format convertor 27. In this instance, the detector 26 detects existence of data to be displayed on a diagonal line of a frame using the inverse quantized DCT coefficients from the inverse quantizer 22 and provides a relevant signal to the format convertor 27, accordingly. That is, as a DCT block inverse quantized in the inverse quantizer 22 has 8×8 coefficients, total 64 coefficients are provided to the detector 26. Of the 64 DCT coefficients, the detector 26 determines existence of edge components in a DCT block according to a number of non-zero coefficients of the 63 coefficients for a high frequency region, excluding a direct current component. For example, as it can be known that, the more the number of non-zero coefficients, the more the edge components exist, the detector 26 may provide a relevant signal accordingly to the format convertor 27, to determine a edge level according to the number of non-zero coefficients. Sensing from a signal of the VLD 21 that a received video source is an SD data and sensing from a signal of the detector 26 that there are edge components in the SD data, the format convertor 27 carries out basic format conversion operations as well as an interpolation operation of the edge components of the input data according to the equation 1 shown below, different from the interpolation operation for the vertical and horizontal components.

$$a'=(c_1*a+c_2*b)/(c_1+c_2),$$

$$b'=(c_2*a+c_1*b)/(c_1+c_2).$$

The above equation 1 is one of general pixel interpolation equations, where "a" and "b" denote actual pixels, a' and b' denote pixels after the interpolation, and $c_1$ and $c_2$ are interpolation coefficients. And, according to an experiment, it is found that an interpolation with $c_1$ and $c_2$ being 1 and 1, or 1 and 2, or 2 and 1 provides the best picture quality. The interpolation coefficients $c_1$ and $c_2$ may be differ depending on positions of pixels to be interpolated and extents of the edge components. An extent of distortion of an image is dependent on the interpolation coefficients $c_1$ and $c_2$. Thereafter, the image having prevented of distortion by the aforementioned interpolation of the edge components and format conversion is displayed on the monitor 28 for users. In the meantime, interpolation of vertical and horizontal components, except the edge components, by the line doubling as before does not cause any problem.

As has been explained, since distortion of an image can be prevented in a digital TV both by an interpolation to an HD image using an interpolation equation and format conversion when it is determined that a video source is an SD image and edge components of the SD image are detected using inverse quantized DCT coefficients, the device and method for converting video format of a digital TV of the present invention have an advantage of allowing prevention of degradation of a picture quality.

It will be apparent to those skilled in the art that various modifications and variations can be made in the device and method for converting a video format of a digital TV of the present invention without departing from the spirit or scope of the invention. Thus, it is intended that the present invention cover the modifications and variations of this invention provided they come within the scope of the appended claims and their equivalents.

What is claimed is:

1. A device for converting a video format of a digital TV, the device having an inverse quantizer, an IDCT (Inverse Discrete Cosine Transformation) and motion compensator, the device comprising:

a detector for detecting existence of edge components from an SD image data and providing a relevant signal, accordingly; and, a format converter for interpolating and format converting an SD image data obtained by adding an SD image data from the IDCT and an SD image data from the motion compensator according to an output from the detector, wherein said format converter interpolates using an interpolation equation according to the relevant signal provided by the detector, the interpolation equation is, $a'=(c_1*a+c_2*b)/(c_1+c_2)$ and $b'=(c_2*a+c_1*b)/(c_1+c_2)$, where, "a" and "b" denote actual pixels, "a'" and "b'" denote pixels after the interpolation, and $c_1$ and $c_2$ are interpolation coefficients, and the interpolation coefficients $c_1$ and $c_2$ are varied depending on a number of non-zero DCT coefficients.

2. A device as claimed in claim 1, further comprising a VLD(Variable Length Decoder) for making a variable length decoding of a received bit stream to detect a received video source of being an SD image data and providing a signal according to a result of the detection to the format convertor.

3. A device as claimed in claim 1, wherein the detector detects existence of edge components according to inverse quantized DCT coefficients of the SD image data.

4. A device as claimed in claim 1, wherein the format convertor has an interpolation equation for converting vertical and horizontal components of the SD image data into an HD image format and an interpolation equation for edge components of the SD image data into the HD image format.

5. A device as claimed in claim 1, further comprising an adder for adding an output from the IDCT and an output from the motion compensator to restore an original image.

6. A method for converting a video format of a digital TV having an inverse quantizer, the method comprising the steps of:

(1) detecting existence of edge components in an SD image data from the inverse quantizer; and, (2) interpolating the SD image data by using an interpolation equation according to a result of detection in the step (1), to make a format conversion of the SD image data into an HD image data, wherein the interpolation equation applied when the edge components exist in the SD image data is, $a'=(c_1*a+c_2*b)/(c_1+c_2)$ and $b'=(c_2*a+c_1*b)/(c_1+c_2)$, where, "a" and "b" denote actual pixels, "a'" and "b'" denote pixels after the interpolation, and $c_1$ and $c_2$ are interpolation coefficients, and the interpolation coefficients $c_1$ and $c_2$ are varied depending on a number of non-zero DCT coefficients.

7. A method as claimed in claim 6, wherein the existence of edge components is detected according to a number of non-zero DCT coefficients of the SD image data in the step (1).

8. A method as claimed in claim 6, wherein, in the step (2), an interpolation equation according to the result of detection of the edge components of the SD image is applied.

9. A method as claimed in claim 6, wherein an extent of image distortion is dependent on the interpolation coefficients $c_1$ and $c_2$.

10. A method as claimed in claim 6, wherein an interpolation with $c_1$ and $c_2$ being 1 and 1, or 1 and 2, or 2 and 1 provides the best picture quality.

* * * * *